W. E. CREASE.
BEEHIVE.
APPLICATION FILED JAN. 21, 1920.

1,393,757.

Patented Oct. 18, 1921.

Witness
Bessie P. Toomey.

Inventor
Walter E. Crease
By Joseph A. Miller
Attorney

UNITED STATES PATENT OFFICE.

WALTER E. CREASE, OF EAST GREENWICH, RHODE ISLAND.

BEEHIVE.

1,393,757.           Specification of Letters Patent.      Patented Oct. 18, 1921.

Application filed January 21, 1920. Serial No. 352,939.

*To all whom it may concern:*

Be it known that I, WALTER E. CREASE, a citizen of the United States, residing at East Greenwich, in the county of Kent and State of Rhode Island, have invented new and useful Improvements in Beehives, of which the following is a specification.

This invention relates to certain new and useful improvements in beehives and the main object of the same is to provide a hive with a plurality of separate compartments each for containing a queen bee, the swarm of worker-bees, and the brood cells or comb.

The invention further resides in the provision of means whereby two or more queen bees may be located in one hive which results in the building up of strong swarms of worker-bees and consequently an increased production of honey.

Further the invention resides in the features of construction hereinafter described and claimed, reference being made to the accompanying drawing wherein—

Figure 1:
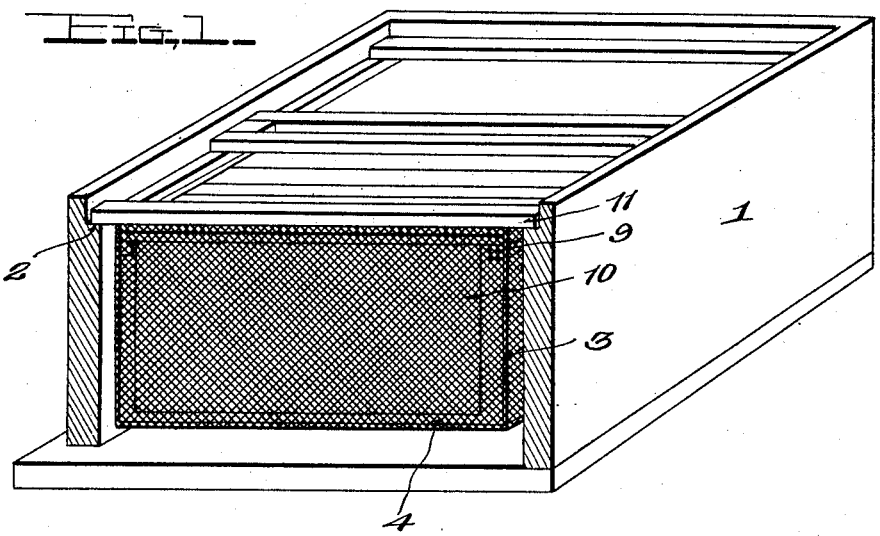
Figure 2:
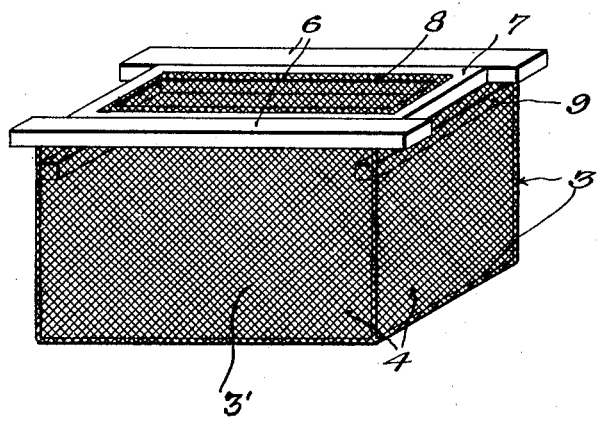

Figure 1 is a perspective view, in fragment, of a beehive embodying the present invention, and Fig. 2 is a perspective view of one of the cages or compartments.

Referring more in detail to the drawing, the numeral 1 designates the beehive having ledges 2 along two opposite edges for suspending the cages or compartments 3' therefrom. Each cage comprises a frame work 3 of heavy wire which is covered by a wire mesh 4, and both the frame and wire are secured to the bars or supports 6 that extend slightly beyond the cage at each end for seating on the ledges 2 and thereby holding the cages in proper position. A removable top, consisting of a rectangular frame 7 and a foraminous filler 8, fits between the two supports 6 in close contact with the upper edge of the cage.

Within the cage at a predetermined distance below the top are two transverse supports 9 from which the brood combs 10 are suspended by the strips 11. These brood combs are spaced sufficiently far apart and the cages are supported at a distance from the bottom and sides of the hive walls so that the bees will have free access to pass upwardly between the cages to the storage supers that are located above the brood chamber.

The wire covering is of such a mesh that the queen bee cannot pass out but the worker-bees, being smaller bodied, can freely enter to supply the queen and the brood with the necessary food. This provision permits the housing of a plurality of queens in a single hive, thereby producing strong swarms of worker-bees and materially increasing the production of honey. Obviously, the shape and form of the cages can be varied and accomplish the same object without departing from the spirit of the invention.

Having thus described my invention, what I claim as new and desire to secure by Letters Patent is:

In combination with a beehive having opposed ledges, a cage composed of a pair of spaced side bars formed to seat at their ends on said ledges, a frame having a foraminous covering secured to the bars and depending therefrom, transverse bars secured to the frame and within the covering and extending transversely of the side bars, strips carrying brood combs supported at their ends on the transverse bars, and a removable top for the cage consisting of a rectangular frame having a mesh filler fitted in the space between the side bars of the cage so as to be held in position by the side bars of the cage.

In testimony whereof I have signed my name to this specification in the presence of two subscribing witnesses.

WALTER E. CREASE.

Witnesses:
BESSIE P. TOOMEY,
J. A. MILLER.